United States Patent [19] [11] 4,358,862
Altman et al. [45] Nov. 16, 1982

[54] CONNECTOR ASSEMBLY FOR WHIRLPOOL SYSTEM

[75] Inventors: Murray Altman, Fort Lee, N.J.; Gerald J. Bellasalma, Glendale, Calif.

[73] Assignee: Thermasol, Ltd., Leonia, N.J.

[21] Appl. No.: 212,413

[22] Filed: Dec. 3, 1980

Related U.S. Application Data

[63] Continuation-in-part of Ser. No. 5,377, Jan. 22, 1979, Pat. No. 4,240,166.

[51] Int. Cl.³ .............................................. A47C 19/12
[52] U.S. Cl. .......................................... 4/542; 4/492; 4/661; 4/541; 138/111; 138/115; 128/66
[58] Field of Search .................. 4/661, 559, 543, 542, 4/584, 615, 622, 544, 491, 490, 447, 448, 443, 541; 128/66; 138/111, 115, 114, 38

[56] References Cited

U.S. PATENT DOCUMENTS

| | | | |
|---|---|---|---|
| 1,526,179 | 2/1925 | Parr et al. | 4/541 X |
| 1,655,222 | 1/1928 | Elze | 4/661 X |
| 1,807,796 | 6/1931 | Reid | 138/111 X |
| 1,830,853 | 11/1931 | Ostarhage | 4/559 |
| 1,896,938 | 2/1933 | Borowsky | 4/543 |
| 1,982,259 | 11/1934 | Martin | 4/542 |
| 2,340,926 | 2/1944 | Bradley | 138/38 X |
| 2,663,325 | 12/1953 | Bede | 138/111 X |
| 2,705,329 | 4/1955 | Exon-Porter | 4/584 |
| 2,713,421 | 7/1955 | Wigton | 209/169 |
| 2,757,965 | 8/1956 | Andrews | 138/111 |
| 2,870,456 | 1/1959 | Greensides | 4/559 |
| 2,929,408 | 3/1960 | Weatherwax | 138/38 |
| 2,984,261 | 5/1961 | Kates | 138/46 |
| 3,027,568 | 4/1962 | Blau et al. | 4/615 |
| 3,038,469 | 6/1962 | Jacuzzi | 128/66 |
| 3,110,754 | 11/1963 | Witort et al. | 174/70 |
| 3,251,071 | 5/1966 | Wood | 4/543 |
| 3,263,678 | 8/1966 | Everston | 4/559 X |
| 3,297,025 | 1/1967 | Jacuzzi | 4/559 X |
| 3,326,210 | 6/1967 | Roberts | 4/559 X |
| 3,374,492 | 3/1968 | Ruderian | 4/544 |
| 3,391,870 | 7/1968 | Nash | 4/559 X |
| 3,396,412 | 8/1968 | Francom | 4/542 |
| 3,533,404 | 10/1970 | Labarber | 4/559 |
| 3,540,438 | 11/1970 | Jacuzzi | 4/559 X |
| 3,541,616 | 11/1970 | Stricker | 4/542 |
| 3,548,815 | 12/1970 | Everston | 128/66 |
| 3,567,134 | 3/1971 | Smith | 138/115 |
| 3,571,820 | 3/1971 | Jacuzzi | 4/542 |
| 3,605,131 | 9/1971 | Brazel et al. | 4/491 |
| 3,614,952 | 10/1971 | Agnellino | 4/544 X |
| 3,625,258 | 12/1971 | Phelps | 138/115 |
| 3,628,529 | 12/1971 | Steimle | 4/559 X |
| 3,672,359 | 6/1972 | Krohn | 4/559 X |
| 3,672,532 | 6/1972 | Becker | 138/89 X |
| 3,805,847 | 4/1974 | Manning | 138/115 |
| 3,806,031 | 4/1974 | Olson | 138/44 X |
| 3,883,366 | 5/1975 | Blumenfeld | 4/490 X |
| 3,890,656 | 6/1975 | Mathis | 4/542 |
| 3,903,929 | 9/1975 | Mock | 138/115 X |
| 3,905,358 | 9/1975 | Jacuzzi | 4/559 X |
| 3,924,245 | 12/1975 | Eaton et al. | 340/172.5 |
| 3,946,449 | 3/1976 | Mathis | 4/542 |
| 3,978,886 | 9/1976 | Mathis | 4/492 X |
| 3,986,217 | 10/1976 | Doerr et al. | 4/542 |
| 4,000,528 | 1/1977 | Posnick | 4/584 |
| 4,041,553 | 8/1977 | Sussman | 4/447 |
| 4,086,937 | 5/1978 | Hechler | 137/559 |
| 4,135,255 | 1/1979 | Menendez | 4/448 |
| 4,264,039 | 4/1981 | Moreland | 4/542 X |

Primary Examiner—Henry K. Artis
Attorney, Agent, or Firm—Lerner, David, Littenberg & Samuel

[57] ABSTRACT

A connector assembly is adapted to connect an outlet of a whirlpool system to air and water supply channels. Because the connector assembly is removably mounted to the air and water supply channels between the ends thereof, the air and water supply channels can be made from a continuous piece of tubing.

50 Claims, 11 Drawing Figures

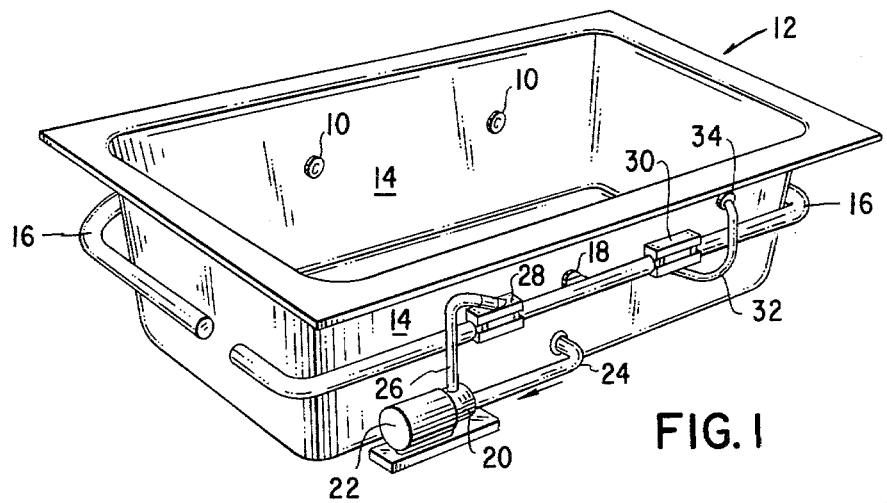
FIG. 1
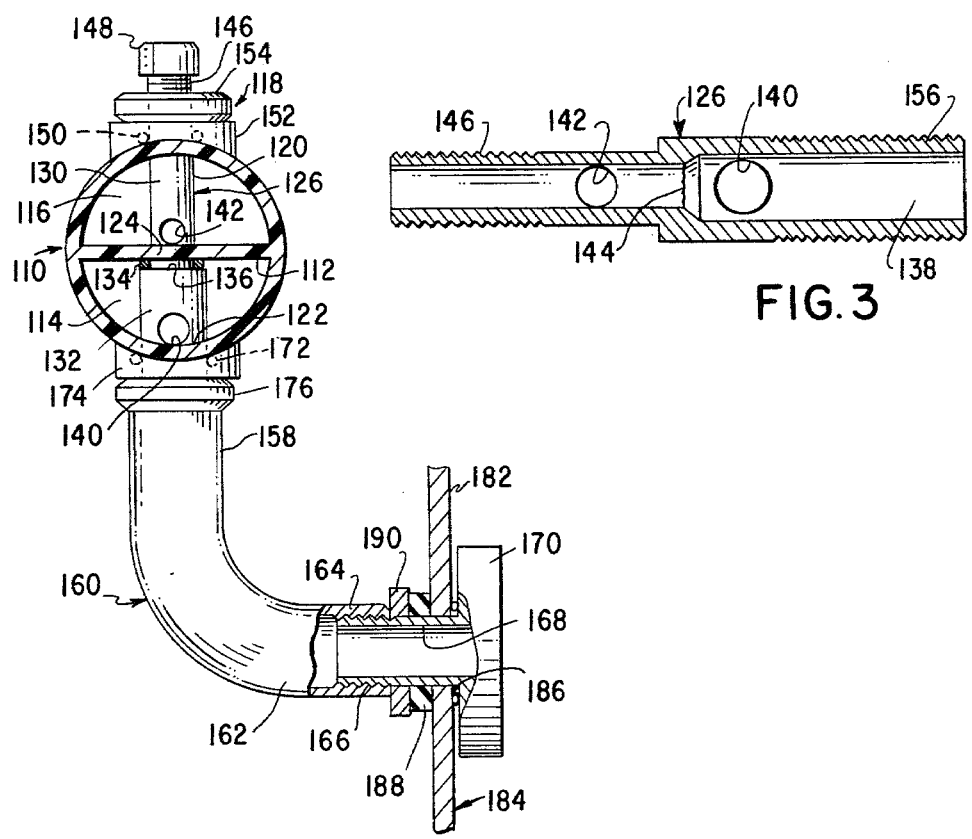
FIG. 2
FIG. 3

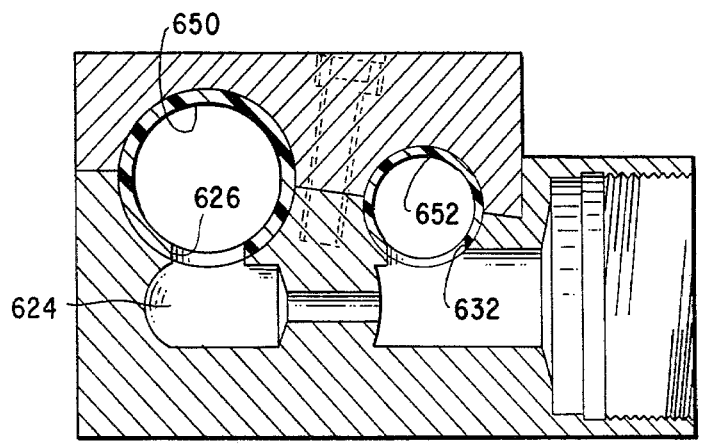
FIG. 6
FIG. 7
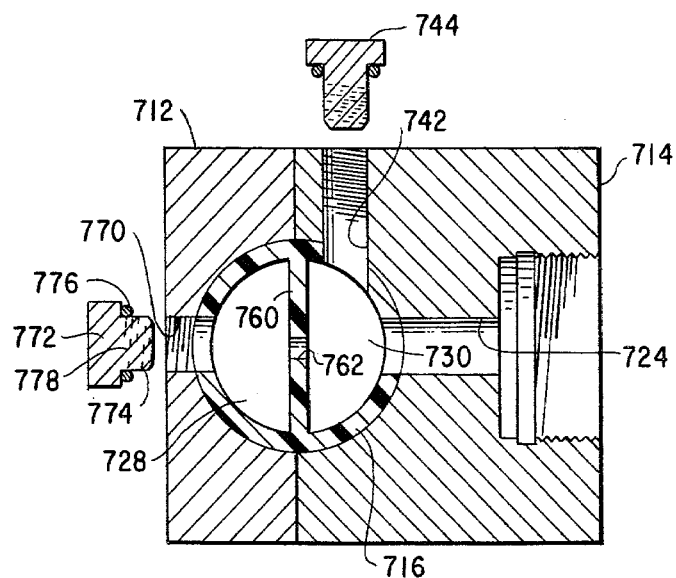
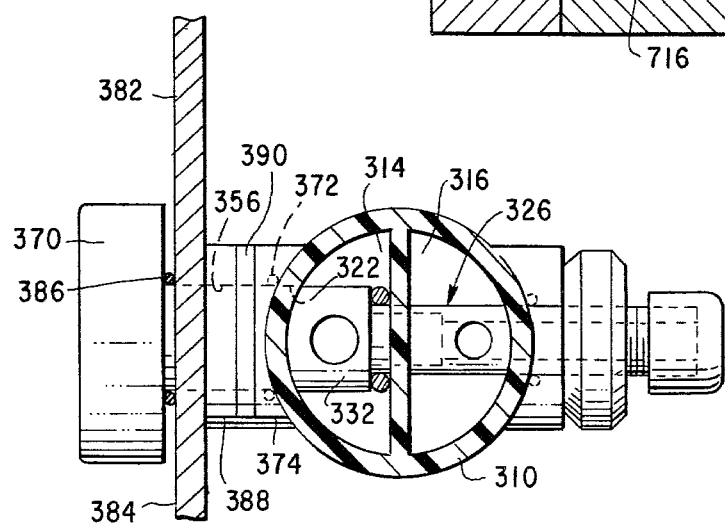
FIG. 8

CONNECTOR ASSEMBLY FOR WHIRLPOOL SYSTEM

CROSS REFERENCE TO RELATED APPLICATION

This is a continuation-in-part of U.S. Pat. application Ser. No. 5,377, filed on Jan. 22, 1979 now U.S. Pat. No. 4,240,166.

FIELD OF THE INVENTION

The present invention relates to a whirlpool systems and, more particularly, to such systems which are adapted for use in conventional bathtub installations.

BACKGROUND OF THE INVENTION

Recently, travelers, businessmen, skiers, golfers, tennis players and other sprotsmen have become increasingly aware of the benefits of a whirlpool bath in which water is agitated to create an invigorating whirlpool motion. The swirling waters of a whirlpool bath are believed by many to calm frayed nerves, ease the pain of aching muscles, and sooth sore feet.

In recognition of the increasing popularity of whirlpool baths, many motels, hotels, and inns are installing in-room whirlpool baths in an effort to gain a competitive edge. However, in order to be profitable, and therefore result in a true competitive edge, such whirlpool baths must be simple to install, operate and service.

Some known whirlpool baths, such as the one disclosed in Jacuzzi U.S. Pat. No. 3,571,820, include a number of jet assemblies spaced around the outer periphery of a bathtub for agitating water in the bathtub. In these known whirlpool baths, water and air supply piping systems, including several pieces of pipe joined together by elbows and T-fittings, are used to supply each of the jet assemblies with water and air, respectively. The installation of the elbows and T-fittings increases construction time and costs, in terms of both materials and labor. The elbows and T-fittings also complicate repairs and replacement.

Evenston U.S. Pat. No. 3,263,678 discloses a therapeutic bathtub having a plurality of aspirating fittings designed specifically to diffuse finely divided air bubbles throughout the water in the bathtub. Thus, the aspirating fittings perform a function, i.e., the diffusion of finely divided bubbles, which is different from and may be performed in addition to the conventional function of providing agitated water to produce a whirlpool bath. Nevertheless, the aspirator fittings are supplied water and air from a piping network in which several individual pieces of pipe are interconnected by elbows and T-fittings.

Efforts have been made to avoid the problems and disadvantages resulting from the use of elbows and T-fittings in whirlpool systems. For instance, in Mathis U.S. Pat. No. 3,890,656, there is disclosed a whirlpool jet for bathtubs which purportedly eliminates the use of T-fittings by making all water and air pipe connections directly to a corresponding water jet outlet. However, because the water jet outlets described and claimed in the Mathis patent are actually T-fittings, which have been designed to perform a jetting function, the water jet outlets of each pair of adjacent outlets are connected by separate pieces of water and air supply pipes. The provision of several pieces of pipe not only complicates installation, thereby increasing initial construction time and costs, but also complicates repairs and replacements resulting in increased maintenance costs. Furthermore, inasmuch as the individual outlets are parmanently cemented to the water and air supply pipes, the outlets are totally incapable of quick and easy on-site removal independently of the water and air supply pipes for inspection, cleaning and replacement purposes.

SUMMARY OF THE INVENTION

Many of the disadvantages and shortcomings of the whirlpool baths and other devices discussed above are overcome by the present invention which includes a new and improved connector assembly for use in a whirlpool system normally including a plurality of outlets spaced around the interior of a water receptacle, such as a bathtub, a water supply channel connected to a source of water, and an air supply channel connected to a source of air. In accordance with one aspect of the improvement, each of the outlets is connected to the air and water supply channels by a unique removable connector assembly which, in one advantageous embodiment, includes a nozzle adapted to extend into both of the channels, one end of the nozzle being connected to a respective one of the outlets. The nozzle includes a passageway, which extends thorugh the nozzle from one end thereof to the other end, and a pair of inlet openings. One of the inlet openings communicates between the passageway and the air supply channel to permit air to flow from the air supply channel to an associated outlet. The other inlet opening communicates between the passageway and the water supply channel to form a flow path for water from the water supply channel to the associated outlet. Although the water and air can be supplied under pressure, the portion of the passageway between the inlet openings includes a venturi for enhancing the mixture of the air and water and for speeding their flow through the passageway.

Because the nozzle is inserted into the channels, it can be installed simply by providing an appropriate number of access openings to the air and water supply channels, thereby permitting the channels to be formed in a single piece of dual channel tubing or a pair of individual continuous conduits. If the other end of the passageway lies outside of the water and air supply channels, it can be capped with a removable plug which, when removed, provides quick and easy access to the interior of the nozzle for cleaning and inspection purposes without necessitating the removal of the nozzle or the dismantling of the entire whirlpool system.

Alternatively, the connector assemblies can be saddle clamps having a pair of saddle members which are movable with respect to each other so as to clamp over the outer surface of a piece of dual channel tubing or a pair of individual continuous conduits. One of the saddle members has a passageway which communicates with the water supply channel and/or the air supply channel and a respective one of the outlets. A venturi is provided in the passageway or, if the channels are formed in a single piece of dual channel tubing, in the partition between adjacent channels of the dual channel tubing. The venturi enhances the mixture of the air and water and speeds their flow through the passageway.

Like the nozzles discussed above, the saddle clamps may be removed without dismantling the entire whirlpool system. Also, by providing a suitable access opening to the passageway, it can be made accessible for quick and easy inspection, and if necessary, cleaning.

BRIEF DESCRIPTION OF THE DRAWINGS

For a more complete understanding of the invention, reference may be had to the following description of seven exemplary embodiments taken in conjunction with the acompanying figures of the drawings, in which:

FIG. 1 is a perspective view of one embodiment of a whirlpool system constructed in accordance with the present invention;

FIG. 2 is a partial cross-sectional view of a first exemplary embodiment of a connector assembly constructed in accordance with the present invention;

FIG. 3 is a cross-sectional view of a nozzle utilized in the connector assembly illustrated in FIG. 2;

FIG. 6 is a cross-sectional view of a fourth exemplary embodiment of a connector assembly constructed in accordance with the present invention;

FIG. 7 is a cross-sectional view of a fifth exemplary embodiment of a connector assembly constructed in accordance with the present invention;

FIG. 8 is a cross-sectional view of a sixth exemplary embodiment of a connector assembly constructed in accordance with the present invention;

DESCRIPTION OF THE EXEMPLARY EMBODIMENTS

I. The Overall System

Figure 4:
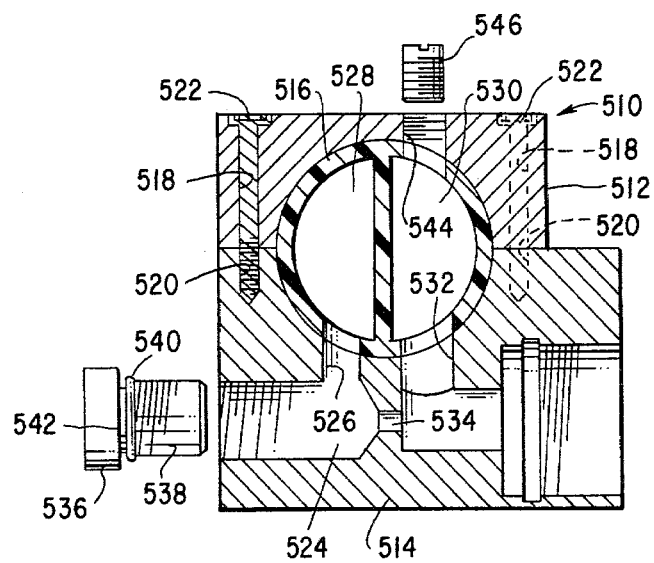
FIG. 4 is a cross-sectional view of a second exemplary embodiment of a connector assembly constructed in accordance with the present invention.

The whirlpool system shown in FIG. 1 includes a number of outlets 10 which are spaced apart around the periphery of a bathtub 12. Each of the outlets 10 extends through a sidewall 14 of the bathtub 12 below a predetermined water level line and is connected to a continuous loop of dual channel tubing 16 by a connector assembly 18. The loop of dual channel tubing 16 has a shape which generally matches the outer contour of the bathtub 12.

A pump 20, driven by a motor 22, receives water from the bathtub 12 through a return line 24, which communicates with the interior of the bathtub 12 below its predetermined water level line. Water under pressure is supplied from the pump 20 to one channel of the dual channel tubing 16 through a flexible hose 26 and a saddle clamp type connector 28. Another saddle clamp type connector 30 is connected by a flexible hose 32 to an air port 34 located above the predetermined water level line of the bathtub 12, so that the port 34 will always be open to the atmosphere for supplying air to the other channel of the dual channel tubing 16 at atmospheric pressure.

II. The Nozzle Type Connector Assembly Embodiments

As shown in FIGS. 2 and 3, dual channel tubing 110 has a cylindrical shape, although any other suitable shape may be used, with a partition 112 extending across the interior of the tubing 110 to form an air channel 114 and a water channel 116. Although the partition 112 is shown extending across a diameter of the dual channel tubing 110, the partition 112 may extend across any chord of the tubing 110.

At each location where a connector assembly 118 is to be inserted through the dual channel tubing 110, a pair of holes 120, 122 is provided, the hole 120 being formed in the top of the tubing 110 diametrically opposite the hole 122, which is formed in the bottom of the tubing 110. Another hole 124, having a diameter substantially equal to the diameter of the hole 120 but somewhat less than the diameter of the hole 122, is formed in the partition 112 and aligned with the holes 120, 122, so that a nozzle 126 can be inserted therethrough.

The nozzle 126, which forms a part of a corresponding connector assembly 118, includes a small diameter portion 130, which extends through the holes 120, 124 and the water channel 116, and a large diameter portion 132, which extends through the hole 122 and into the air channel 114. An O-ring 134 interposed between the partition 112 and a shoulder 136 formed at the juncture of the small diameter portion 130 and the large diameter portion 132 forms a fluid-tight seal between the air channel 114 and the water channel 116.

A fluid passageway 138 (see FIG. 3) runs the length of the nozzle 126 and communicates with the air channel 114 and the water channel 116 through an air inlet opening 140 and a water inlet opening 142, respectively. To facilitate drainage of water from the dual channel tubing 110, the bottoms of the air inlet opening 140 and the water inlet opening 142 are at an elevation no higher than the elevation of the bottoms of the air channel 114 and the water channel 116, respectively. The portion of the passageway 138 between the air inlet opening 140 and the water inlet opening 142 includes a venturi 144 (see FIG. 3) designed to enhance the mixing of water and air in the passageway 138 and to speed the flow of water and air through the passageway 138.

The free end of the small diameter portion 130 extends upwardly through the hole 120 formed in the top of the dual channel tubing 110 and is provided with an externally threaded portion 146 designed to threadedly engage an internally threaded cap 148. By removing the cap 148, access may be had to the passageway 138 for the purposes of inspection and cleaning.

An O-ring 150, disposed about the free end fo the small diameter portion 130, seals the hole 120 formed in the top of the dual channel tubing 110. The O-ring 150 is held in sealing engagement against the top of the tubing 110 by a jaw member 152, which is slidably received on the free end of the small diameter portion 130 of the nozzle 126, and a lock nut 154, which has an internally threaded portion (not shown) adapted to threadedly engage the externally threaded portion 146 of the free end of the small diameter portion 130, for forcing the jaw member 152 into positive engagement with the O-ring 150.

The free end of the large diameter portion 132 of the nozzle 126 extends downwardly through the hole 122 in the bottom of the dual channel tubing 110. An externally threaded portion 156 provided on the free end of the large diameter portion 132 threadedly engages an internally threaded portion (not shown) formed in the vertical end 158 of a relatively rigid elbow 160. The horizontal end 162 of the elbow 160 has an internally threaded portion 164 which threadedly engages an externally threaded portion 166 formed on a stem portion 168 of an outlet 170. Although the elbow 160 is shown as having a 90° bend, the bend can be more or less then 90° depending upon the designs and relative positions of the nozzle 126 and the outlet 170. Moreover, the elbow 160 could be replaced by a flexible hose or any other suitable connecting device.

An O-ring 172, disposed about the free end of the large diameter portion 132, seals the hole 122 formed in the bottom of the dual channel tubing 110. The O-ring 172 is held in sealing engagement against the bottom of the tubing 110 by a jaw member 174, which is slidably received on the free end of the large diameter portion 132 and forced into positive engagement with the O-ring 172 by a lock nut 176 threadedly engaged on the free end of the large diameter portion 132.

A fluid-tight seal is also formed between the outlet 170 and a sidewall 182 of a bathtub 184 by an O-ring 186, a gasket 188, and a lock nut 190. The O-ring 186 is disposed about the stem portion 168 of the outlet 170 between the outlet 170 and the sdewall 182. The gasket 188 and the lock nut 190 are also disposed about the stem portion 168, but on the opposite side of the sidewall 182 from the O-ring 186. The lock nut 190 threadedly engages the externally threaded portion 166 of the stem portion 168 so as to force the O-ring 186 and the gasket 188, both of which can be made of rubber or any other suitable material, into sealing engagement with the sidewall 182 of the bathtub 184.

Referring now to FIGS. 5, 8 and 9–11, there are shown three further embodiments of the exemplary connector assembly embodiment of FIGS. 2 and 3. The various elements illustrated in FIGS. 5, 8 and 9–11 which correspond to elements described above with respect to FIGS. 2 and 3 have been designated by corresponding reference numerals increased by 100, 200, and 300, respectively. Unless otherwise stated, the embodiments of FIGS. 5, 8 and 9–11 operate in the same manner as the embodiment of FIGS. 2 and 3.

Figure 5:
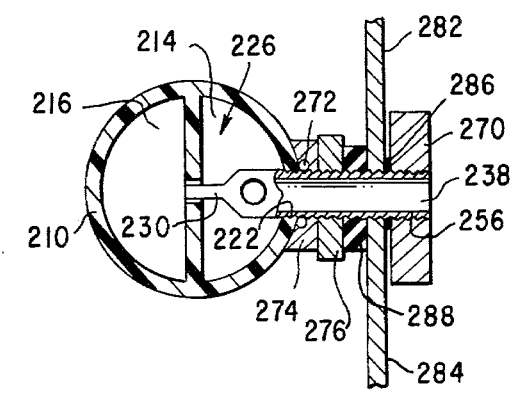
FIG. 5 is a cross-sectional view of a third exemplary embodiment of a connection assembly constructed in accordance with the present invention.

In the embodiment of FIG. 5, a horizontally extending nozzle 226 has a small diameter portion 230 which communicates with a water channel 216 but does not extend therethrough. The interior end of a passageway 238 extending through the nozzle 226 functions as a water inlet, thereby replacing the water inlet opening 142 of the embodiment of FIGS. 2 and 3. An outlet 270 is adapted to threadedly engage a threaded portion 256 on the nozzle 226. An O-ring 272, jaw member 274, gasket 288, and lock nut 276 are positioned between a sidewall 282 of a bathtub 284 and the outer circumferential surface of a continuous loop of dual channel tubing 210 to form a water-tight seal for an opening 222 in the side of the tubing 210. The lock nut 276 forces the O-ring 272 into sealing engagement with the dual channel tubing 210. Another O-ring 286 and the gasket 288 are forced into sealing engagement with the sidewall 282 of the bathtub 284 by the outlet 270. Although the direct connection of the nozzle 226 with the outlet 270 eliminates the elbow 160 of the embodiment of FIGS. 2 and 3, it necessitates arranging the water channel 216 alongside an air channel 214, rather than above it.

The embodiment of FIG. 8 also includes a continuous piece of dual channel tubing 310 having a water channel 316, which is arranged alongside an air channel 314. Because the elbow 160 of the embodiment of FIGS. 2 and 3 is dispensed with, an outlet 370 is internally threaded so that it can threadedly engage an externally threaded portion 356 on the free end of a large diameter portion 332 of the nozzle 326. O-rings 372, 386, jaw member 374, gasket 388, and lock nut 376 form a water-tight seal for an opening 322 in the side of the tubing 310 and an opening in a sidewall 382 of a bathtub 384.

Figure 9:
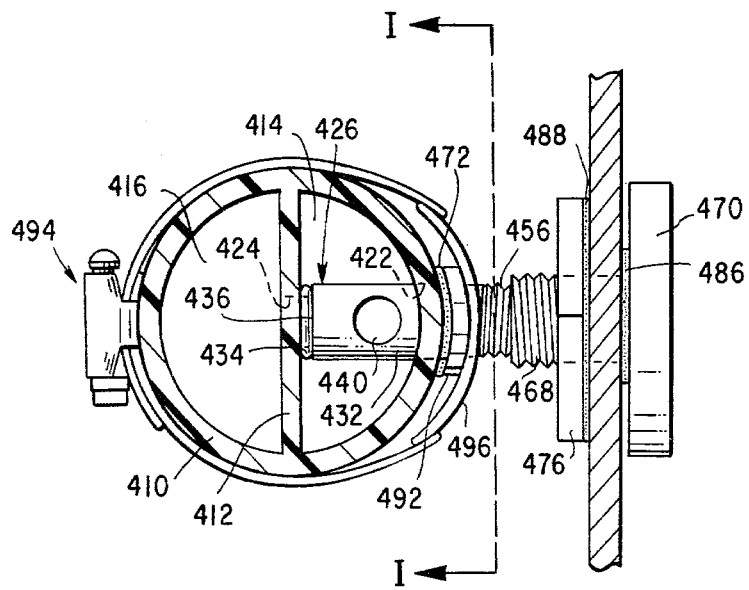
FIG. 9 is a cross-sectional view of a seventh exemplary embodiment of a connector assembly constructed in accordance with the present invention.
Figure 11:
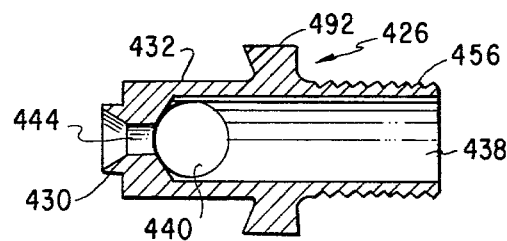
FIG. 11 is a cross-sectional view of a nozzle utilized in the connector assembly shown in FIGS. 9 and 10.
Figure 10:
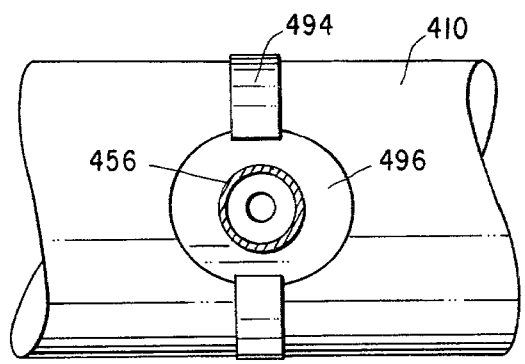
FIG. 10 is a cross-sectional view, taken along line I—I in FIG. 9 and looking in the direction of the arrows, of the connector assembly of FIG. 9.

In the embodiment of FIGS. 9–11, a horizontally extending nozzle 426 has a small diameter portion 430 which communicates with a water channel 416 formed in a continuous loop of dual channel tubing 410. The small diameter portion 430 of the nozzle 426 extends into an opening 424 in a partition 412, which separates the water channel 416 from an air channel 414. However, the small diameter portion 430 of the nozzle 426 does not extend through the water channel 416. The interior end of a passageway 438, which extends through the nozzle 426, functions as a water inlet, thereby replacing the water inlet opening 142 of the embodiment of FIGS. 2 and 3. The nozzle 426 also includes a large diameter portion 432, which extends through an opening 422 in the air channel 414 formed in the dual channel tubing 410. An O-ring 434 interposed between the partition 412 and a shoulder 436 formed at the juncture of the small diameter portion 430 and the large diameter portion 432 forms a fluid-tight seal between the air channel 414 and the water channel 416. The large diameter portion 432 has an air inlet opening 440, which communicates between the air channel 414 and the passageway 438, and a threaded portion 456, which is adapted to threadedly engage an internally and externally threaded stem portion 468 of an outlet 470. A circumferential flange 492 extends radially outwardly from the large diameter portion 432 of the nozzle 426. An adjustable and removable band clamp 494, having a donut-shaped collar 496 adapted to receive the large diameter portion 432 of the nozzle 426 (see FIG. 10), cooperates with the flange 492 of the nozzle 426 to force a gasket 472 into sealing engagement with the outer circumferential surface of the dual channel tubing 410, thereby forming a water-tight seal for the opening 422 in the dual channel tubing 410. The passageway 438 includes a venturi 444 (see FIG. 11), designed to enhance mixing of water and air in the passageway 438 and to speed the flow of water and air through the passageway 438 to the outlet 470. A lock nut 476 cooperates with the outlet 470 to force an O-ring 486 and a gasket 488 into sealing engagement with a sidewall 482 of the bathtub 484.

III. The Saddle Clamp Type Connector Assembly Embodiments

As shown in FIG. 4, a saddle clamp 510 includes a pair of saddle members 512, 514. The saddle member 512 is positioned on the upper side of a piece of dual channel tubing 516, the saddle member 514 being positioned on the lower side of the tubing 516 substantially diametrically opposite the saddle member 512.

The saddle member 512 includes holes 518 passing completely therethrough. The holes 518 are aligned with blind bores 520 in the adjacent surface of the saddle member 514. The holes 518 and the bores 520 are internally threaded so as to receive externally threaded bolts 522 which removably clamp the saddle members 512 and 514 about the tubing 516. The bolts 522 also permit the position of the saddle members 512, 514 to be adjusted with respect to each other.

The saddle member 514 includes a passageway 524 extending therethrough below the dual channel tubing 516. A water inlet opening 526 communicates between a water channel 528 of the tubing 516 and the passageway 524. The passageway 524 also communicates with an air channel 530 through an air inlet opening 532 in the saddle member 514. The portion of the passageway 524 between the water inlet opening 526 and the air inlet opening 532 includes a venturi 534 for enhancing the mixture of water and air and for speeding the flow of the water and air thorugh the passageway 524. The end of the passageway 524 nearest the air inlet opening 532 is internally threaded so as to receive an externally threaded portion of an outlet (not shown) mounted in the sidewall of a water receptacle, such as a bathtub. A plug 536 has an externally threaded portion 538 which threadedly engages an internally threaded portion of the passageway 524 at the opposite end thereof. An O-ring 540 is disposed about a shank portion 542 of the plug 536 to provide a water-tight seal.

The saddle member 512 has an internally threaded opening 544 which communicates at one end with the air channel 530 of the tubing 510. An externally threaded plug 546 is threadedly received in the opening 544, so that the air channel 530 may be selectively opened and closed to the atmosphere.

FIGS. 6 and 7 illustrate further exemplary embodiments of the connector assembly of FIG. 4. The various elements illustrated in FIGS. 6 and 7 which correspond to elements described above with respect to FIG. 4 have been designated by corresponding reference numerals increased by 100 and 200, respectively. The embodiments of FIGS. 6 and 7 operate in the same manner as the embodiment of FIG. 4, unless it is otherwise stated.

Referring to FIG. 6, a water inlet opening 626 of a passageway 624 communicates with the interior of a water supply conduit 650. An air inlet opening 632 communicates between the passageway 624 and the interior of an air supply conduit 652.

As shown in FIG. 7, a piece of dual channel tubing 716 is flanked on either side by saddle members 712, 714. The tubing 716 includes a partition 760 which extends across the interior thereof along a diameter or any other chord. An aperture 762 in the partition 760 permits a water channel 728 on one side of the partition 760 to communicate with an air channel 730 on the other side of the partition 760, the aperture 762 acting as a venturi for enhancing the mixture of water and air and for speeding the flow of water and air out of the tubing 716 and through a passageway 724 provided in the saddle member 714. A vertical opening 742 in the saddle member 714 connects the air channel 730 to the atmosphere. A plug 744 threadedly received in the opening 742 permits the selective opening and closing of the air channel 730 to the atmosphere. A horizontal internally threaded opening 770 in the saddle member 712 communicates with a water channel 728 of the tubing 716. A plug 772 has an externally threaded opening 770 in the saddle member 712 for permitting access to the water channel 728. An O-ring 776 disposed about a shank portion 778 of the plug 772 forms a water-tight seal.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A connector assembly for use in a whirlpool system, which includes a water supply channel and an air supply channel, comprising a nozzle insertable into the water and air supply channels, said nozzle including a passageway extending therethrough, first providing means for providing fluid communication between said passageway and the water supply channel, and second providing means, spaced from said first providing means, for providing fluid communication between said passageway and the air supply channel, the portion of said passageway between said first and second providing means including a venturi.

2. A connector assembly according to claim 1, wherein said nozzle extends completely through the water and air supply channels.

3. A connector assembly according to claim 2, wherein one end of said nozzle includes attaching means for removably attaching said nozzle to an outlet of the whirlpool system and the other end of said nozzle includes preventing means for preventing fluid flow through said other end of said nozzle, said preventing means being removably attached to said other end of said nozzle, whereby access may be had to said passageway of said nozzle for the purpose of inspecting and cleaning said passageway.

4. A connector assembly according to claim 3, further comprising clamping means for removably clamping said nozzle to the water and air supply channels.

5. A connector assembly according to claim 3, wherein the water supply channel is one channel of a section of multiple channel tubing and the air supply channel is another channel of the multiple channel tubing.

6. A connector assembly according to claim 5, further comprising first sealing means for sealing the water supply channel from the air supply channel.

7. A connector assembly according to claim 6, further comprising clamping means for removably clamping said nozzle to the multiple channel tubing.

8. A connector assembly according to claim 7, wherein the multiple channel tubing is dual channel tubing.

9. A connector assembly according to claim 8, wherein said one end of said nozzle is sized and shaped so as to extend through an opening provided in one of the channels of the dual channel tubing and said other end of said nozzle is sized and shaped so as to extend through an opening provided in the other channel of the dual channel tubing.

10. A connector assembly according to claim 9, further comprising second sealing means for sealing both of the openings provided in the dual channel tubing.

11. A connector assembly according to claim 10, wherein said first and second sealing means include said clamping means.

12. A connector assembly according to claim 3, wherein said attaching means attaches said nozzle to the outlet of the whirlpool system such that said nozzle is arranged vertically, whereby said first and second providing means are arranged one above the other.

13. A connector assembly according to claim 3, wherein said attaching means attaches said nozzle to the outlet of the whirlpool system such that said nozzle is arranged horizontally, whereby said first and second providing means are arranged side by side.

14. A connector assembly according to claim 2, wherein said first providing means is a first radially extending opening in said nozzle and second providing means is a second radially extending opening in said nozzle.

15. A connector assembly according to claim 1, wherein one end of said nozzle extends outwardly from one of the water and air supply channels and the other end of said nozzle communicates with the other of the water and air supply channels.

16. A connector assembly according to claim 15, wherein said one end of said nozzle includes attaching means for removably attaching said nozzle to an outlet of the whirlpool system.

17. A connector assembly according to claim 16, further comprising clamping means for removably clamping said nozzle to the water and air supply channels.

18. A connector assembly according to claim 17, wherein said clamping means includes a band clamp.

19. A connector assembly according to claim 18, wherein said band clamp includes receiving means for releasably receiving said one end of said nozzle.

20. A connector assembly according to claim 16, wherein the water supply channel is one channel of a section of multiple channel tubing and the air supply channel is another channel of the multiple channel tubing.

21. A connector assembly according to claim 20, further comprising first sealing means for sealing the water supply channel from the air supply channel.

22. A connector assembly according to claim 21, further comprising clamping means for removably clamping said nozzle to the multiple channel tubing.

23. A connector assembly according to claim 22, wherein the multiple channel tubing is dual channel tubing.

24. A connector assembly according to claim 23, wherein the dual channel tubing has an outer surface having a substantially circular transverse cross-sectional shape, the dual channel tubing including a partition extending across the interior thereof to form the water and air supply channels, said nozzle extending through the dual channel tubing substantially perpendicular to the partition.

25. A connector assembly according to claim 24, wherein the partition extends generally diametrically across the interior of the dual channel tubing and said nozzle extends generally radially into the dual channel tubing.

26. A connector assembly according to claim 24, wherein said nozzle has a length selected such that said other end of said nozzle is positioned in an opening in the partition of the dual channel tubing.

27. A connector assembly according to claim 26, wherein said one end of said nozzle is sized and shaped so as to extend through an opening provided in the outer surface of the dual channel tubing.

28. A connector assembly according to claim 27, further comprising second sealing means for sealing the opening in the outer surface of the dual channel tubing.

29. A connector assembly according to claim 28, wherein said first and second sealing means include said clamping means.

30. A connector assembly according to claim 26, wherein said first providing means is an axially extending opening in said nozzle and said second providing means is a radially extending opening in said nozzle.

31. A connector assembly according to claim 16, wherein said attaching means attaches said nozzle to the outlet of the whirlpool system such that said nozzle is arranged horizontally.

32. A connector assembly for use in a whirlpool system, which includes a water supply channel and an air supply channel positioned adjacent the water supply channel, comprising a saddle clamp, having a pair of saddle members and clamping means for removably clamping said saddle members about the water and air supply channels, one of said saddle members having a passageway extending therethrough, a first providing means for providing fluid communication between said passageway and the water supply channel, and second providing means, spaced from said first providing means, for providing fluid communication between said passageway and the air supply channel, the portion of said passageway between said first and second providing means including a venturi.

33. A connector assembly according to claim 32, wherein said passageway extends completely through said one saddle member.

34. A connector assembly according to claim 33, wherein one end of said passageway includes attaching means for removably attaching said saddle clamp to an outlet of the whirlpool system and the other end of said passageway includes preventing means for preventing fluid flow through said other end of said passageway, said preventing means being removably received in said other end of said passageway, whereby access may be had to said passageway for the purpose of inspecting and cleaning said passageway.

35. A connector assembly according to claim 34, further comprising third providing means for providing communication between the air supply channel and the atmosphere.

36. A connector assembly according to claim 35, wherein said other saddle member includes said third providing means.

37. A connector assembly according to claim 36, wherein the water supply channel is one channel of a section of multiple channel tubing and the air supply channel is another channel of the multiple channel tubing.

38. A connector assembly according to claim 37, wherein the multiple channel tubing is dual channel tubing.

39. A connector assembly according to claim 32, wherein the water supply channel is formed in a first piece of tubing and the air supply channel is formed in a second piece of tubing.

40. A connector assembly according to claim 32, wherein said clamping means releasably attaches said saddle members to each other.

41. A connector assembly for use in a whirlpool system, which includes a water supply channel and an air supply channel in fluid communication with the water supply channel, comprising a saddle clamp, having a pair of saddle members and clamping means for removably clamping said saddle members about the air and water supply channels, one of said saddle members having a passageway extending therethrough and communicating with one of the water and air supply channels.

42. A connector assembly according to claim 41, wherein one end of said passageway communicates with the air supply channel and the other end of the passageway includes attaching means for removably attaching said saddle clamp to an outlet of the whirlpool system.

43. A connector assembly according to claim 42, further comprising first providing means for providing communication between the air supply channel and the atmosphere.

44. A connector assembly according to claim 43, wherein said one saddle member includes said first providing means.

45. A connector assembly according to claim 44, further comprising second providing means for providing communication between the water supply channel and the atmosphere and preventing means for preventing fluid flow through said second providing means, said preventing means being removably received in said second providing means, whereby access may be had to the water supply channel for the purpose of inspecting and cleaning the water supply channel.

46. A connector assembly according to claim 45, wherein the air supply channel is one channel of a section of multiple channel tubing and the water supply channel is another channel of the multiple channel tubing.

47. A connector assembly according to claim 46, wherein the multiple channel tubing is dual channel tubing.

48. A connector assembly according to claim 47, wherein the dual channel tubing includes a partition separating the water supply channel from the air supply channel, the partition including an opening extending between the water supply channel and the air supply channel.

49. A connector assembly according to claim 47, wherein the opening in the partition of the dual channel tubing functions as a venturi.

50. A connector assembly according to claim 41, wherein said clamping means releasably attaches said saddle members to each other.

* * * * *